(12) United States Patent  
Meshkati et al.

(10) Patent No.: US 9,100,899 B2  
(45) Date of Patent: Aug. 4, 2015

(54) APPARATUS AND METHOD FOR MOBILE SEARCH BASED ON SEARCH TRIGGERS

(75) Inventors: Farhad Meshkati, San Diego, CA (US); Gavin Bernard Horn, La Jolla, CA (US); Mehmet Yavuz, San Diego, CA (US); Sanjiv Nanda, Ramona, CA (US); Peter Hans Rauber, San Diego, CA (US); Jen Mei Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/107,646

(22) Filed: May 13, 2011

(65) Prior Publication Data

US 2012/0124088 A1 May 17, 2012

Related U.S. Application Data

(60) Provisional application No. 61/334,941, filed on May 14, 2010.

(51) Int. Cl.  
*G06F 7/00* (2006.01)  
*G06F 17/30* (2006.01)  
*H04W 48/16* (2009.01)  
*H04W 48/18* (2009.01)

(52) U.S. Cl.  
CPC .............. *H04W 48/16* (2013.01); *H04W 48/18* (2013.01)

(58) Field of Classification Search  
None  
See application file for complete search history.

(56) References Cited

U.S. PATENT DOCUMENTS

| | | | |
|---|---|---|---|
| 8,000,352 B2 * | 8/2011 | Chu et al. | 370/503 |
| 8,069,165 B2 * | 11/2011 | Vechersky | 707/716 |
| 2003/0100308 A1 | 5/2003 | Rusch | |
| 2004/0023634 A1 * | 2/2004 | Jeong et al. | 455/403 |
| 2007/0255797 A1 | 11/2007 | Dunn et al. | |
| 2008/0132257 A1 * | 6/2008 | Fok et al. | 455/466 |
| 2008/0170525 A1 | 7/2008 | Geiger | |
| 2009/0042565 A1 | 2/2009 | Hermersdorf et al. | |
| 2009/0231191 A1 * | 9/2009 | Wu et al. | 342/357.09 |
| 2010/0265882 A1 * | 10/2010 | Nagata et al. | 370/328 |
| 2011/0034168 A1 * | 2/2011 | Lindoff et al. | 455/434 |
| 2011/0043652 A1 * | 2/2011 | King et al. | 348/222.1 |
| 2011/0099142 A1 * | 4/2011 | Karjalainen et al. | 707/600 |

FOREIGN PATENT DOCUMENTS

| | | |
|---|---|---|
| CN | 1618208 A | 5/2005 |
| EP | 1885141 A1 | 2/2008 |
| JP | 2008182378 A | 8/2008 |
| JP | 2011501604 A | 1/2011 |

(Continued)

OTHER PUBLICATIONS

International Search Report and Written Opinion—PCT/US2011/036705, ISA/EPO—Aug. 19, 2011.

*Primary Examiner* — Rehana Perveen  
*Assistant Examiner* — Raheem Hoffler

(57) ABSTRACT

An apparatus and method for mobile search using search triggers including establishing a search state for a mobile search; defining a search scheduler based on the search state; determining to collect a search trigger for the search scheduler based on the search state; updating the search state using the collected search trigger and in accordance with the search scheduler; and performing a search for a search type based on the updated search state and in accordance with the search scheduler.

41 Claims, 11 Drawing Sheets

(56) References Cited

FOREIGN PATENT DOCUMENTS

| WO | WO0207459 | A2 | 1/2002 |
| WO | WO2005039112 | A1 | 4/2005 |
| WO | WO2006076794 | A1 | 7/2006 |
| WO | WO2008008987 | A2 | 1/2008 |
| WO | WO-2009157600 | A1 | 12/2009 |

* cited by examiner

APPARATUS AND METHOD FOR MOBILE SEARCH BASED ON SEARCH TRIGGERS

CLAIM OF PRIORITY UNDER 35 U.S.C. §119

The present Application for Patent claims priority to Provisional Application No. 61/334,941 entitled Search Trigger Based Mobile Search filed May 14, 2010, and assigned to the assignee hereof and hereby expressly incorporated by reference herein.

FIELD

This disclosure relates generally to apparatus and methods for cell searching. More particularly, the disclosure relates to mobile search using search triggers.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of another telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Disclosed is an apparatus and method for mobile search using searching triggers. According to one aspect, a method for mobile search using search triggers includes establishing a search state for a mobile search; defining a search scheduler based on the search state; determining to collect a search trigger for the search scheduler based on the search state; updating the search state using the collected search trigger and in accordance with the search scheduler; and performing a search for a search type based on the updated search state and in accordance with the search scheduler.

According to another aspect, an apparatus includes a processor and a memory, the memory containing program code executable by the processor for performing the following: establishing a search state for a mobile search; defining a search scheduler based on the search state; determining to collect a search trigger for the search scheduler based on the search state; updating the search state using the collected search trigger and in accordance with the search scheduler; and performing a search for a search type based on the updated search state and in accordance with the search scheduler.

According to yet another aspect, an apparatus for mobile search using search triggers includes means for establishing a search state for a mobile search; means for defining a search scheduler based on the search state; means for determining to collect a search trigger for the search scheduler based on the search state; means for updating the search state using the collected search trigger and in accordance with the search scheduler; and means for performing a search for a search type based on the updated search state and in accordance with the search scheduler.

According to yet another aspect, a computer-readable medium storing a computer program, wherein execution of the computer program is for establishing a search state for a mobile search; defining a search scheduler based on the search state; determining to collect a search trigger for the search scheduler based on the search state; updating the search state using the collected search trigger and in accordance with the search scheduler; and performing a search for a search type based on the updated search state and in accordance with the search scheduler.

Advantages of the present disclosure may include more efficient and timely searching, and avoidance of unnecessary searches which degrade the battery life of a device, particularly that of a mobile device.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

Figure 1:
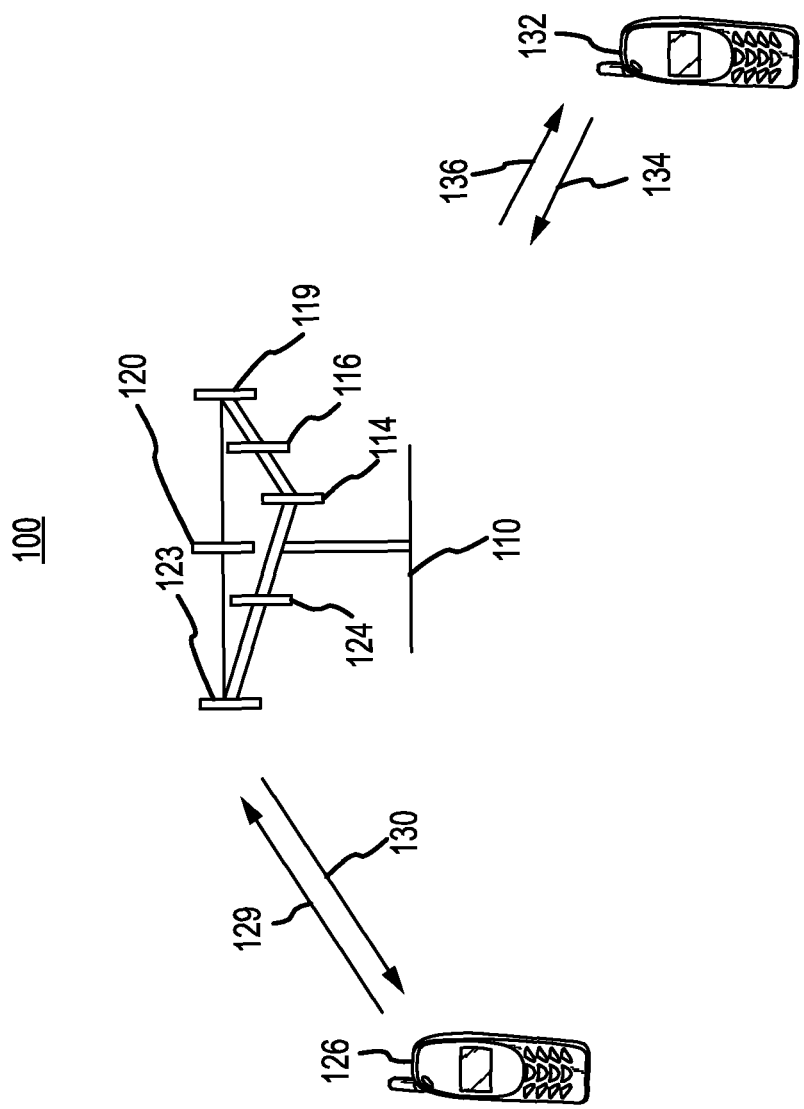
FIG. 1 illustrates an example block diagram of a wireless communication environment suitable for network to mobile communication.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). Cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

FIG. 1 illustrates an example block diagram of a wireless communication environment suitable for network to mobile communication. An access point 110 (AP) includes multiple antenna groups, one including 119 and 120, another including 123 and 124, and an additional including 114 and 116. In FIG. 1, only two antennas are shown for each antenna group, however, more or fewer antennas may be utilized for each antenna group. Access terminal 126 (AT) (erg., a user equipment or UE) is in communication with antennas 123 and 124, where antennas 123 and 124 transmit information to access terminal 126 over forward link 130 and receive information from access terminal 126 over reverse link 129. Access terminal 132 is in communication with antennas 114 and 116, where antennas 114 and 116 transmit information to access terminal 132 over forward link 136 and receive information from access terminal 132 over reverse link 134. In a FDD system, for example, communication links 129, 130, 134 and 136 may use different frequencies for communication. For example, forward link 130 may use a different frequency then that used by reverse link 129.

Each group of antennas and/or the area in which they are designed to communicate is often referred to as a sector of the access point. In one example, each antenna group communicates with access terminals in a sector of the areas covered by access point 110.

In communication over forward links 130 and 136, the transmitting antennas of access point 110 utilize beamforming in order to improve the signal-to-noise ratio of forward links for the different access terminals 126 and 132. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, a user equipment (UE), a wireless communication device, a terminal or by some other terminology.

Figure 2:
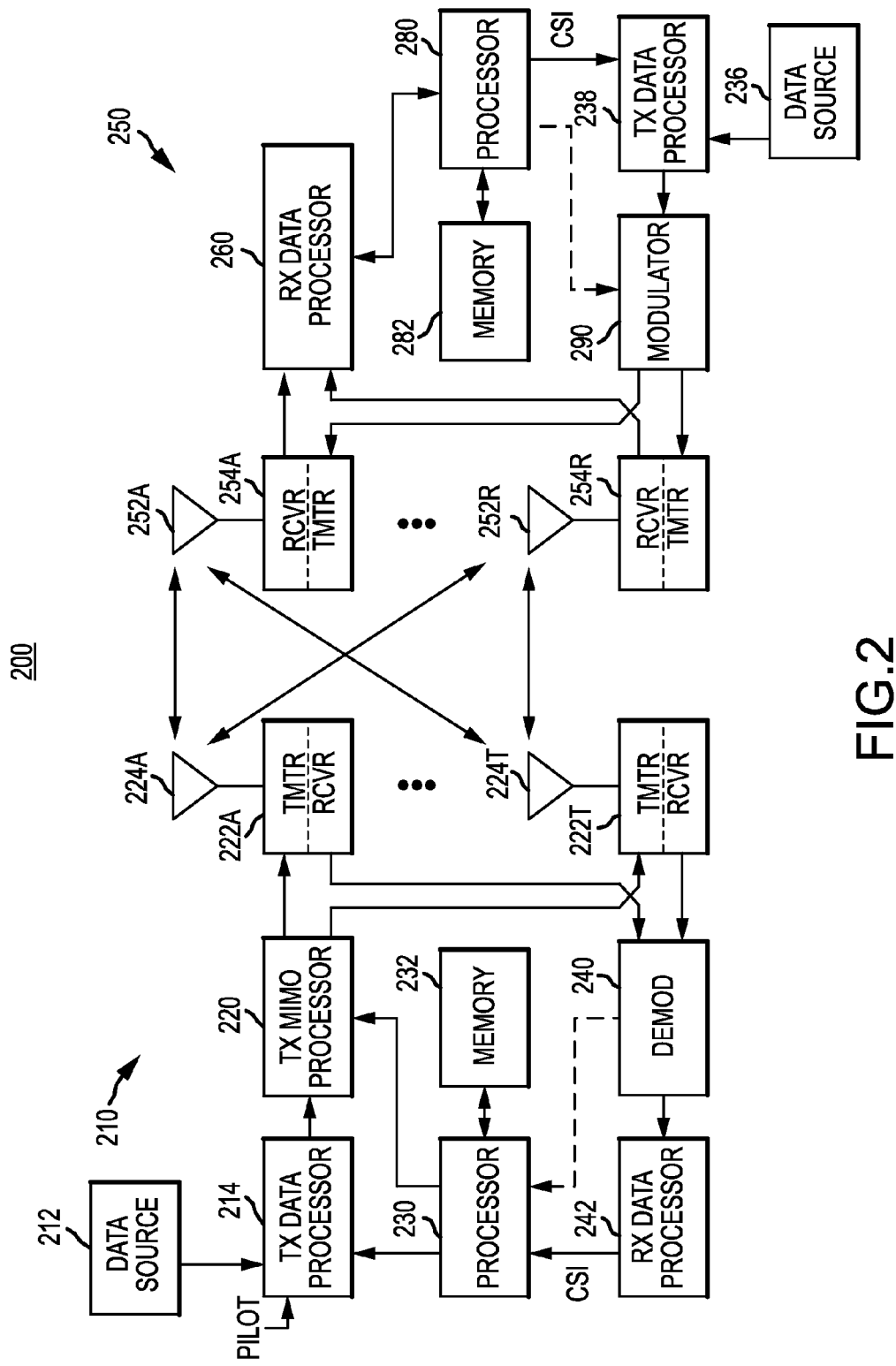
FIG. 2 illustrates an example block diagram of a transmitter system (also known as an access point) and a receiver system (also known as an access terminal) in a MIMO system.

FIG. 2 illustrates an example block diagram of a transmitter system 210 (also known as an access point) and a receiver system 250 (also known as an access terminal) in a MIMO system 200.

At the transmitter system 210, traffic data for a number of data streams is provided from a data source 212 to a transmit (TX) data processor 214. For example, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222A through 222T. In one aspect, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222A through 222T are then transmitted from $N_T$ antennas 224A through 224T, respectively.

At receiver system 250, the transmitted modulated signals are received by $N_R$ antennas 252A through 252R and the received signal from each antenna 252 is provided to a respective receiver (RCVR) 254A through 254R. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 280 may periodically determine which precoding matrix to use (discussed below). For example, processor 280 formulates a reverse link message including a matrix index portion and a rank value portion.

The reverse link message may include various types of information regarding the communication link and/or the received data stream. The reverse link message is then processed by a TX data processor 238, which also receives traffic data for a number of data streams from a data source 236, modulated by a modulator 290, conditioned by transmitters 254A through 254R, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reverse link message transmitted by the receiver system 250. Processor 230 then determines which pre-coding matrix to use for determining the beamforming weights then processes the extracted message.

In an aspect, logical channels are classified into Control Channels and Traffic Channels. Logical Control Channels include Broadcast Control Channel (BCCH) which is a DL channel for broadcasting system control information. Paging Control Channel (PCCH) is a DL channel that transfers paging information. Multicast Control Channel (MCCH) is a point-to-multipoint DL channel used for transmitting Multimedia Broadcast and Multicast Service (MBMS) scheduling and control information for one or several Multicast Traffic Channels (MTCH)s. Generally, after establishing RRC connection this channel is only used by UEs that receive MBMS. Dedicated Control Channel (DCCH) is a point-to-point bi-directional channel that transmits dedicated control information and is used by UEs having an RRC connection. In one aspect, Logical Traffic Channels include a Dedicated Traffic Channel (DTCH) which is a point-to-point bi-directional channel, dedicated to one UE, for the transfer of user information. Also, the Logical Traffic Channels may comprise a MTCH for Point-to-multipoint DL channel for transmitting traffic data.

In an aspect, Transport Channels are classified into downlink (DL) and uplink (UL) channels. DL Transport Channels may include a Broadcast Channel (BCH), a Downlink Shared Data Channel (DL-SDCH) and a Paging Channel (PCH). The PCH is for support of UE power saving (DRX cycle is indicated by the network to the UE), is broadcasted over an entire cell and is mapped to PHY resources which may be used for other control/traffic channels. The UL Transport Channels include a Random Access Channel (RACH), a Request Channel (REQCH), an Uplink Shared Data Channel (UL-SDCH) and a plurality of PHY channels. The PHY channels include a set of DL channels and UL channels.

The DL PHY channels may include a Common Pilot Channel (CPICH), a Synchronization Channel (SCH), a Common Control Channel (CCCH), a Shared DL Control Channel (SDCCH), a Multicast Control Channel (MCCH), and a Shared UL Assignment Channel (SUACH). Furthermore, the DL PHY channels may include an Acknowledgement Channel (ACKCH), a DL Physical Shared Data Channel (DL-PSDCH), a UL Power Control Channel (UPCCH), a Paging Indicator Channel (PICH), and a Load Indicator Channel (LICH).

The UL PHY Channels may include a Physical Random Access Channel (PRACH), a Channel Quality Indicator Channel (CQICH), and an Acknowledgement Channel (ACKCH). Further, the UL PHY channels may include an Antenna Subset Indicator Channel (ASICH), a Shared Request Channel (SREQCH), a UL Physical Shared Data Channel (UL-PSDCH), and a Broadband Pilot Channel (BPICH). One skilled in the art would understand that the various types of channels listed herein are not exclusive and that other channels may be used without affecting the scope or spirit of the present disclosure.

For the purposes of the present disclosure, one or more of the following abbreviations may apply:

| | |
|---|---|
| AM | Acknowledged Mode |
| AMD | Acknowledged Mode Data |
| ARQ | Automatic Repeat Request |
| BCCH | Broadcast Control CHannel |
| BCH | Broadcast CHannel |
| C- | Control- |
| CCCH | Common Control CHannel |
| CCH | Control CHannel |
| CCTrCH | Coded Composite Transport Channel |
| CP | Cyclic Prefix |
| CRC | Cyclic Redundancy Check |
| CTCH | Common Traffic CHannel |
| DCCH | Dedicated Control CHannel |
| DCH | Dedicated CHannel |
| DL | DownLink |
| DL-SCH | DownLink Shared CHannel |
| DSCH | Downlink Shared CHannel |
| DTCH | Dedicated Traffic CHannel |
| FACH | Forward link Access CHannel |
| FDD | Frequency Division Duplex |
| L1 | Layer 1 (physical layer) |
| L2 | Layer 2 (data link layer) |
| L3 | Layer 3 (network layer) |
| LI | Length Indicator |
| LSB | Least Significant Bit |
| MAC | Medium Access Control |
| MBMS | Multimedia Broadcast Multicast Service |
| MBSFN | Multicast Broadcast Single Frequency Network |
| MCCH | MBMS point-to-multipoint Control CHannel |
| MCE | MBMS Coordinating Entity |
| MCH | Multicast CHannel |
| MRW | Move Receiving Window |
| MSB | Most Significant Bit |
| MSCH | MBMS Control CHannel |
| MSCH | MBMS point-to-multipoint Scheduling CHannel |
| MTCH | MBMS point-to-multipoint Traffic CHannel |

-continued

| | |
|---|---|
| PCCH | Paging Control CHannel |
| PCH | Paging CHannel |
| PDCCH | Physical Downlink Control CHannel |
| PDSCH | Physical Downlink Shared Channel |
| PDU | Protocol Data Unit |
| PHY | PHYsical layer |
| PhyCH | Physical CHannels |
| RACH | Random Access CHannel |
| RLC | Radio Link Control |
| RRC | Radio Resource Control |
| SAP | Service Access Point |
| SDU | Service Data Unit |
| SHCCH | SHared channel Control CHannel |
| SN | Sequence Number |
| SUFI | SUper FIeld |
| TCH | Traffic CHannel |
| TDD | Time Division Duplex |
| TFI | Transport Format Indicator |
| TM | Transparent Mode |
| TMD | Transparent Mode Data |
| TTI | Transmission Time Interval |
| U- | User- |
| UE | User Equipment |
| UL | UpLink |
| UM | Unacknowledged Mode |
| UMD | Unacknowledged Mode Data |
| UMTS | Universal Mobile Telecommunications System |
| UTRA | UMTS Terrestrial Radio Access |
| UTRAN | UMTS Terrestrial Radio Access Network |

In wireless communication systems, performance is enhanced when a mobile device (e.g., a UE, mobile terminal, mobile station, etc.) can quickly discover other cells and/or systems besides a serving cell/system. For example, efficient searches can facilitate maintaining good coverage from a mobile device perspective, as well as effectuate capacity offloading. On the other hand, frequent and/or unnecessary searches degrade a battery life of the mobile device. In one example, a mobile device may be camped on a macrocell and moving at high speed. The mobile device, to avoid loss of coverage, must quickly find other macrocells. In another example, a mobile device may return home (e.g., a residence of an associated user), and switch to a femtocell despite good coverage from a macrocell. Such switching enables capacity offload as well as provides additional benefits to the mobile device, such as free minutes, rich applications, etc.

One approach to implement the above noted scenarios, is to set a search threshold high such that the mobile device performs search very frequently. High frequency searching enables the mobile device to discover other cells or systems even when the cells or systems operate on different frequencies and/or when serving cell quality is good. High frequency searching, however, reduces standby time of the mobile device. Another approach is to configure the mobile device to perform periodic searches. However, the periodicity of the search presents a tradeoff between discovery time and battery life impact. For instance, a long period results in long discovery time. Similarly, a short period results in unnecessary searches which degrades battery life.

In one aspect, the present disclosure provides a search trigger-based cell search for avoiding unnecessary searching and for conserving battery power. Based upon a set of search triggers, a search state may be determined. The search state may include one or more search indicators that specify whether a search is necessary, whether a search is beneficial, and/or whether a search can be cheaply performed. The search state may be employed to derive a search schedule for a plurality of search types. Searches corresponding to the search types may be conducted in accordance with the search schedule.

In one aspect, search may be performed, when needed, based upon various search triggers. For example, at a wakeup time, a mobile device can determine whether to collect new input for each search trigger in a set of search triggers. The determination may be based upon a search state and a set of state determination functions, where a function in the set corresponds to a particular search trigger. The mobile device updates the search state based upon search trigger inputs. From the search state and a set of search scheduler functions, each function is associated with a particular type of search, and it is determined whether to perform a search for each search type. Accordingly, the mobile device performs searches only when needed. This allows the mobile device to be able to find other cells or systems quickly for coverage, capacity offload, or other purposes, while avoiding unnecessary searches that result in battery life degradation.

Figure 3:
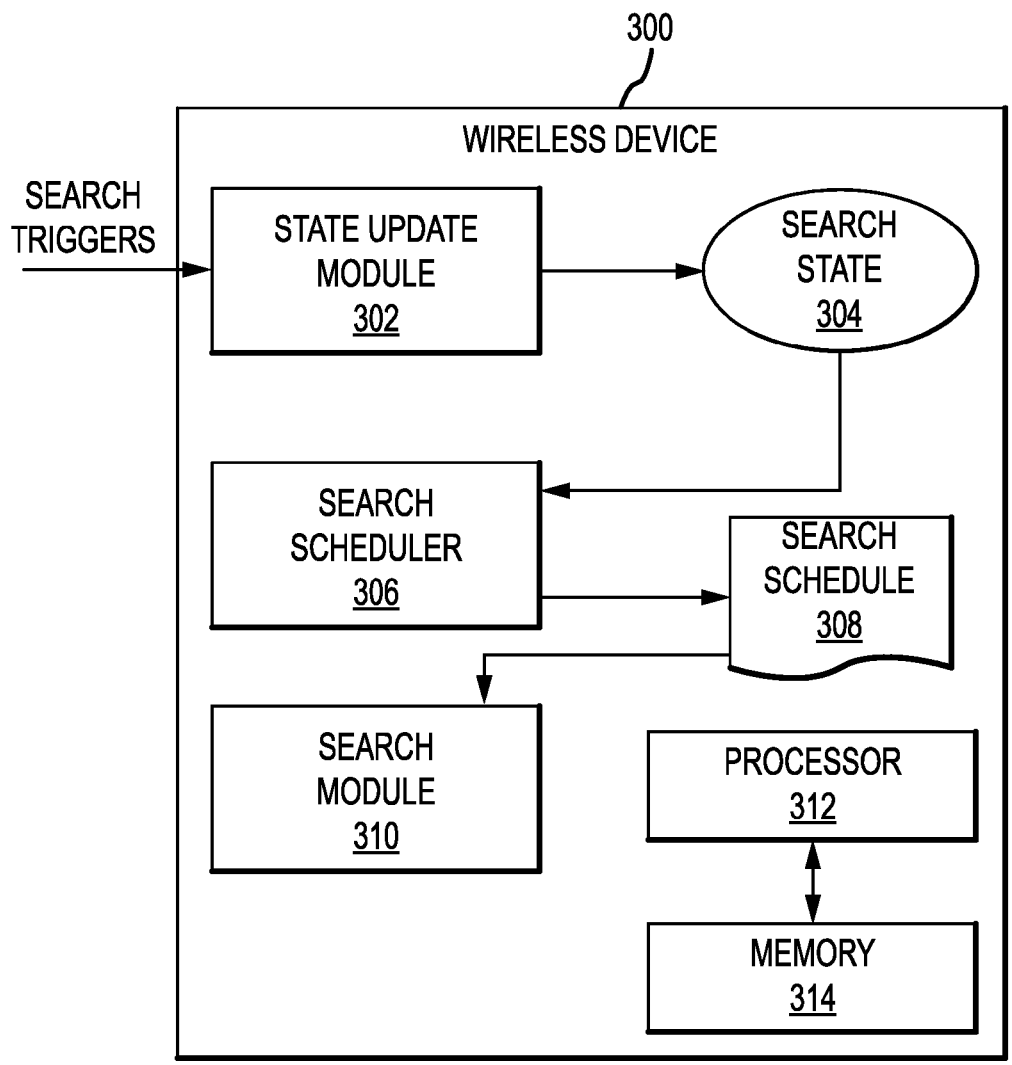
FIG. 3 illustrates a first example wireless device configured to implement a search trigger based on search techniques in accordance with various aspects.

FIG. 3 illustrates a first example wireless device 300 configured to implement a search trigger based on search techniques in accordance with various aspects. In one example, the wireless device 300 may be a user equipment (UE), or a portion thereof, and/or a relay, or portion thereof. The wireless device 300 may operate in a variety of wireless communications networks or systems such as, but not limited to 3GPP LTE, LTE-Advanced, WCDMA, CDMA2000, UMTS, CDMA, WiMAX, HSPA, etc.

In one example, the wireless device 300 includes a state update module 302 that generates and/or updates a search state 304 based upon a set of search trigger inputs. In an aspect, search state 304 may be represented as an n-tuple of search indicators. Search indicators may include, but are not limited to, location, mobility, UE state, etc. In general terms, the search state, S, may be represented as $S=(s_1, s_2, \ldots, s_n)$, where $s_i$ is a value indicating a likelihood of search requirement for the ith indicator. For instance, $s_i$ can take values from a set E (e.g., $s_i$ is an element of E), indicating a probability of a certain search indicator occurring at a given time. The indicator, $s_i$, may also take values from a set of events such as {Yes, No, Uncertain}.

State update module 302 may utilize a set of search trigger inputs to update and/or determine search state 304. The set of search triggers may include various types of search triggers, such as mobility indicators, location indicators, coverage indicators, handset state indicators, search indicators, etc.

Mobility indicators may be measures of current mobility of a UE and may facilitate a determination of whether or not to search (and when) based upon an estimate of mobility. Examples of mobility indicators may include channel quality/signal strength metrics, voltage controlled oscillator (VCO) information, accelerometer information, Global Positioning System (GPS) information, number of cell reselections, etc.

Location indicators may be measures of a current location of a UE and may facilitate determining when to search based on a location estimate and/or when not to repeat a search based on an estimate of immobility (e.g., a UE is stationary). Examples of location indicators may include channel quality/signal strength metrics, GPS, cell identifiers, etc. One skilled in the art would understand that the examples of location indicators listed herein are not meant to be exclusive and that other types of location indicators may be used without affecting the scope or spirit of the present disclosure.

Coverage indicators may be measures of current UE state in terms of available coverage. Such triggers may facilitate determining how aggressively to search for femtocells. Examples of coverage indicators may include channel quality/signal strength metrics.

Other indicators may be used. For example, handset state indicators may provide measures of a current UE state, which facilitate determining a need and/or cost of a new searches. In addition, handset state indicators may facilitate determining when to search for femtocells. Examples may include UE call state (e.g., active call, etc.) and/or other state indicators (e.g., keypad access, phone is on charger, battery level, application-based triggers, etc.). Whether or not a UE is on a charger may be utilized to determine whether the UE requires efficient searching (e.g., not on a charger) or whether a complete search may be performed cheaply (e.g., is on a charger). Certain applications may trigger a search. For example, FemtoZone applications may trigger a search for a femtocell.

Search indicator triggers may provide information about femtocells available in an area to facilitate a determination of whether or not to search for unknown femtocells. In an example, search indicator triggers may include femto identifiers.

In one aspect, search state 304 may include a quadruple of search indicators to indicate a search state of wireless device 300. The search indicators in the quadruple may include a location or FemtoZone indicator, a immobility indicator, a high mobility indicator, and a handset state indicator. In an example, the location or FemtoZone indicator specifies whether wireless device 300 is in a FemtoZone or not. This indicator may take one of three values (e.g., Yes, No, or X, where X means unknown). The immobility indicator specifies whether wireless device 300 is immobile. For instance, a UE may be deemed immobile if its location has not changed for more than a predetermined time period (e.g., 5 minutes, 10 minutes, etc.). In one example, this indicator may take one of three values (e.g., Yes, No, or X, where X means unknown). The high mobility indicator specifies whether wireless device 300 is moving at a high speed. This indicator may take one of three values (e.g., Yes, No, or X, where X means unknown). The handset state indicator provides an indication as to whether wireless device 300 is in a state where search is cheap. This indicator may take one of three values (e.g., Very cheap, Cheap, or Not cheap). In view of the above example, search state 304 may be one of 72 states.

Wireless device 300 may employ a search scheduler 306, which generates a search schedule 308 based, at least in part, on search state 304. Search scheduler 306 may implement a mapping between a search state and a time to search. The time to search may be specified as a search frequency (e.g., how often to search) or as a function of time (e.g., an exponential back-off). In general, a search scheduler may be defined as a mapping $\Psi: S \rightarrow f_S(t)$, wherein $f_S(t)$ represents a function specifying a time of search for a given state, S.

When a search is periodic, $f_S(t)$ may be expressed by a search period, $T_S$, for a given state S. In such cases, the search scheduler $\Psi$ becomes a mapping (e.g., a function) between E to R, where R is a set of real numbers. In an aspect, search scheduler 306 may generate a plurality of search schedules 308, wherein each search schedule corresponds to a particular type of search. In one example, the type of search may include the following:

Type I: searches/measures primary synchronization code(s) (PSC) whose timing is known Type II: searches for a specific PSC or set of PSCs whose timing may or may not be known Type III: searches for all PSCs In the example above where search state 304 is a quadruple of search indicators, search scheduler 306 may map search state 304 into a search frequency (e.g., how often to search) for each of three search types. In one aspect, a simple scheduler with three search frequencies (e.g., high, medium, and low) may be implemented. Table 1 illustrates an example of a search scheduler mapping from search state to search frequency. This table provides frequencies for each search type for all 72 states. Table 2 illustrates a second example of a search scheduler mapping table.

TABLE 1

| Search State | | | | Frequency of Search | | |
| --- | --- | --- | --- | --- | --- | --- |
| Femto zone (FTZ) | Immobility (IM) | High mobility (HM) | Handset state (HS) | Type I Search | Type II Search for Known Femtocells | Type III Search |
| Yes | Yes | No | Very Cheap | High | High | Medium |
| Yes | No | Yes | Very Cheap | High | High | High |
| Yes | No | No | Very Cheap | High | High | High |
| Yes | Yes | X | Very Cheap | High | High | Medium |
| Yes | No | X | Very Cheap | High | High | High |
| Yes | X | Yes | Very Cheap | High | High | High |
| Yes | X | No | Very Cheap | High | High | High |
| Yes | X | X | Very Cheap | High | High | High |
| Yes | Yes | No | Cheap | Medium | Medium | Low |
| Yes | No | Yes | Cheap | High | Low | Medium |
| Yes | No | No | Cheap | High | Medium | Low |
| Yes | Yes | X | Cheap | Medium | Medium | Low |
| Yes | No | X | Cheap | High | Medium | Medium |
| Yes | X | Yes | Cheap | High | Low | Medium |
| Yes | X | No | Cheap | High | Medium | Low |
| Yes | X | X | Cheap | High | Medium | Medium/Low |
| Yes | Yes | No | Not Cheap | Medium | Low | Low |
| Yes | No | Yes | Not Cheap | Medium | Low | Medium |
| Yes | No | No | Not Cheap | Medium | Medium | Low |
| Yes | Yes | X | Not Cheap | Medium | Low | Low |

TABLE 1-continued

| Search State | | | | Frequency of Search | | |
|---|---|---|---|---|---|---|
| Femto zone (FTZ) | Immobility (IM) | High mobility (HM) | Handset state (HS) | Type I Search | Type II Search for Known Femtocells | Type III Search |
| Yes | No | X | Not Cheap | Medium | Medium | Low/Medium |
| Yes | X | Yes | Not Cheap | Medium | Low | Medium |
| Yes | X | No | Not Cheap | Medium | Medium | Low |
| Yes | X | X | Not Cheap | Medium | Medium | Low/Medium |
| No | Yes | No | Very Cheap | High | High | Low |
| No | No | Yes | Very Cheap | High | Medium | High |
| No | No | No | Very Cheap | High | Medium | Medium |
| No | Yes | X | Very Cheap | High | Medium | Low |
| No | No | X | Very Cheap | Medium | Medium | High |
| No | X | Yes | Very Cheap | High | Medium | High |
| No | X | No | Very Cheap | High | Medium | Medium |
| No | X | X | Very Cheap | High | High | High |
| No | Yes | No | Cheap | Medium | Low | Low |
| No | No | Yes | Cheap | High | Low | Low |
| No | No | No | Cheap | Medium | Low | Low |
| No | Yes | X | Cheap | Medium | Low | Low |
| No | No | X | Cheap | High | Medium | Medium |
| No | X | Yes | Cheap | High | Low | Medium |
| No | X | No | Cheap | Medium | Low | Low |
| No | X | X | Cheap | High | Low | Medium/Low |
| No | Yes | No | Not Cheap | Low | Low | Low |
| No | No | Yes | Not Cheap | Medium | Low | Medium |
| No | No | No | Not Cheap | Medium | Low | Low |
| No | Yes | X | Not Cheap | Low | Low | Low |
| No | No | X | Not Cheap | Medium | Low | Low/Medium |
| No | X | Yes | Not Cheap | Medium | Low | Medium |
| No | X | No | Not Cheap | Medium | Low | Low |
| No | X | X | Not Cheap | Medium | Low | Low/Medium |
| X | Yes | No | Very Cheap | High | High | Medium |
| X | No | Yes | Very Cheap | High | High | High |
| X | No | No | Very Cheap | High | High | High |
| X | Yes | X | Very Cheap | High | High | Medium |
| X | No | X | Very Cheap | High | High | High |
| X | X | Yes | Very Cheap | High | High | High |
| X | X | No | Very Cheap | High | High | High |
| X | X | X | Very Cheap | High | High | High |
| X | Yes | No | Cheap | Medium | Medium | Low |
| X | No | Yes | Cheap | High | Low | Medium |
| X | No | No | Cheap | High | Medium | Low |
| X | Yes | X | Cheap | Medium | Medium | Low |
| X | No | X | Cheap | High | Medium | Medium |
| X | X | Yes | Cheap | High | Low | Medium |
| X | X | No | Cheap | High | Medium | Low |
| X | X | X | Cheap | High | Medium | Medium/Low |
| X | Yes | No | Not Cheap | Medium | Low | Low |
| X | No | Yes | Not Cheap | Medium | Low | Medium |
| X | No | No | Not Cheap | Medium | Medium | Low |
| X | Yes | X | Not Cheap | Medium | Low | Low |
| X | No | X | Not Cheap | Medium | Medium/Low | Low/Medium |
| X | X | Yes | Not Cheap | Medium | Low | Medium |
| X | X | No | Not Cheap | Medium | Low | Low |
| X | X | X | Not Cheap | Medium | Medium | Low/Medium |

TABLE 2

| Search State | | | | What to Search | | |
|---|---|---|---|---|---|---|
| Femto Zone (FTZ) Yes/No | Immobility (IM) Yes/No | High mobility (HM) Yes/No | Handset state (HS) Cheap/Not Cheap | Known femto search | Unknown femto search | Comments |
| Yes | Yes | Yes | Cheap | Yes | Yes | Error state 5a: Search at an intermediate rate between Type 1a and Type 2a |
| Yes | Yes | No | Cheap | Yes | Yes | Type 1a: Search frequently (periodically) since it is cheap to do so for both known (since in zone) and unknown femto |
| Yes | No | Yes | Cheap | No | No | Type 2a: Search slowly (periodically) if HM and in zone for both known and unknown femto |
| Yes | No | No | Cheap | Yes | Yes | Type 1a |
| No | Yes | Yes | Cheap | No | Yes | Error state 5b: Search at an intermediate rate between Type 1b and Type 2b |
| No | Yes | No | Cheap | No | Yes | Type 1b: Search frequently (periodically) since it is cheap to do so for unknown femto only (since not in zone) |
| No | No | Yes | Cheap | No | No | Type 2b: Search slowly (periodically) if HM and out of zone for unknown femto only |
| No | No | No | Cheap | No | Yes | Type 1b |
| Yes | Yes | Yes | Not Cheap | Yes | Yes | Error state 6a: Search at an intermediate rate between Type 2a and Type 3a Note: Candidate to merge with 2a or 3a |
| Yes | Yes | No | Not Cheap | Yes | Yes | Type 3a: Search with exponential backoff if IM and in zone for both known and unknown femto |
| Yes | No | Yes | Not Cheap | No | No | Type 2a |
| Yes | No | No | Not Cheap | Yes | Yes | Type 4a: Search with high periodicity if moving slowly in the zone for known femto and with medium periodicity for unknown femto |
| No | Yes | Yes | Not Cheap | No | Yes | Error state 6b: Search at an intermediate rate between Type 2b and Type 3b Note: Candidate to merge with 2b or 3b |
| No | Yes | No | Not Cheap | No | Yes | Type 3b: Search with exponential backoff if IM and not in zone for unknown femto only |
| No | No | Yes | Not Cheap | No | No | Type 2b |
| No | No | No | Not Cheap | No | Yes | Type 4b: Search with medium periodicity if moving slowly outside the zone for unknown femto |

Search frequency may be expressed as a search period or duration. For instance, a high search frequency may be set to correspond to a period of 1 discontinuous reception (DRX) cycle, a medium search frequency may be set to correspond to a period of 20 DRX cycles, and a low search frequency may be set to correspond to a period of 100 DRX cycles. For each type of search, search scheduler 306 assigns a timer value, specified in search schedule 308. The timer value is a minimum of a state-dependent search period (as shown above) and a maximum allowed time between consecutive searches.

In one aspect, the wireless device 310 may include a search module 310 that performs searches in accordance with search schedule 308. For example, the search module 310 may initiate a search at a time specified in the search schedule 308 and/or periodically in accordance with a search frequency specified in the search schedule 308. In one example, a pseudo-random number generator may be used to select whether or not to search. As further illustrated in FIG. 3, wireless device 300 may include a processor 312 and/or a memory 314, which may be utilized to implement some or all the functionality of state update module 302, search scheduler 306, search module 310 and/or other functionality of wireless device 300. In addition, memory 314 may retain search 304 and/or search schedule 308.

Figure 4:
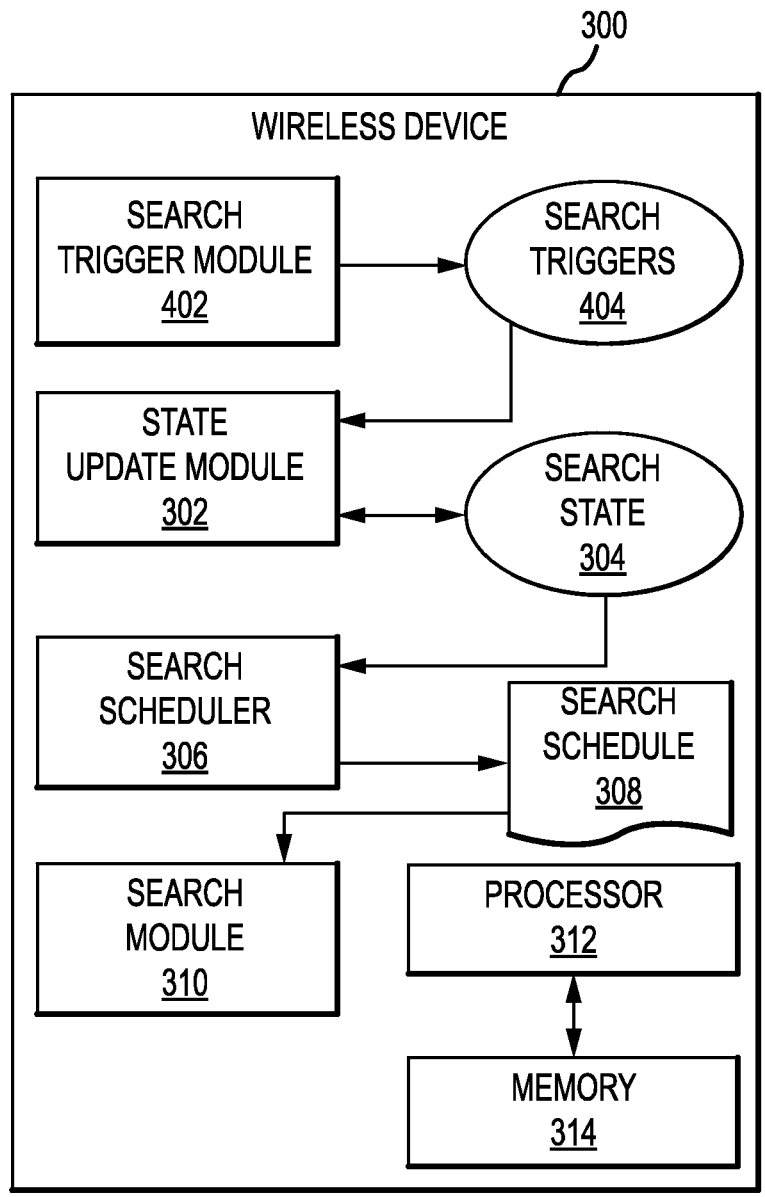
FIG. 4 illustrates a second example wireless device configured to implement a search trigger based search techniques in accordance with various aspects.

FIG. 4 illustrates a second example wireless device configured to implement a search trigger based search techniques in accordance with various aspects. In FIG. 4, the wireless device 300 is illustrated to include a search trigger module 402 for obtaining information to generate search triggers 404. Search triggers 404 may be evaluated by state update module 302 to determine whether or not to update search state 304.

In an example, the search trigger module 402 may implement a mapping between a search state S (e.g., search state 304) and a search trigger collection time. The mapping may be expressed as $\Phi: S \to g_S(t)$, where $g_S(t)$ depends on S as well as a new collection cost for a given search trigger. In one example, separate mappings are defined for each search trigger. In the previous example with a quadruple search state 304, the wireless device 300 can utilize search triggers to determine whether search state 304 has changed. The search triggers can include location information (e.g., GPS, fingerprint), mobility information (e.g., VCO, accelerometer), channel quality, etc. One skilled in the art would understand that the list described herein is an example and not meant to be exclusive.

Search trigger module 402 may acquire information related to search triggers 404 according to search state 304 and/or cost associated with collecting the information. In an example, search trigger module 402 may acquire information with high frequency or low frequency.

Figure 5:
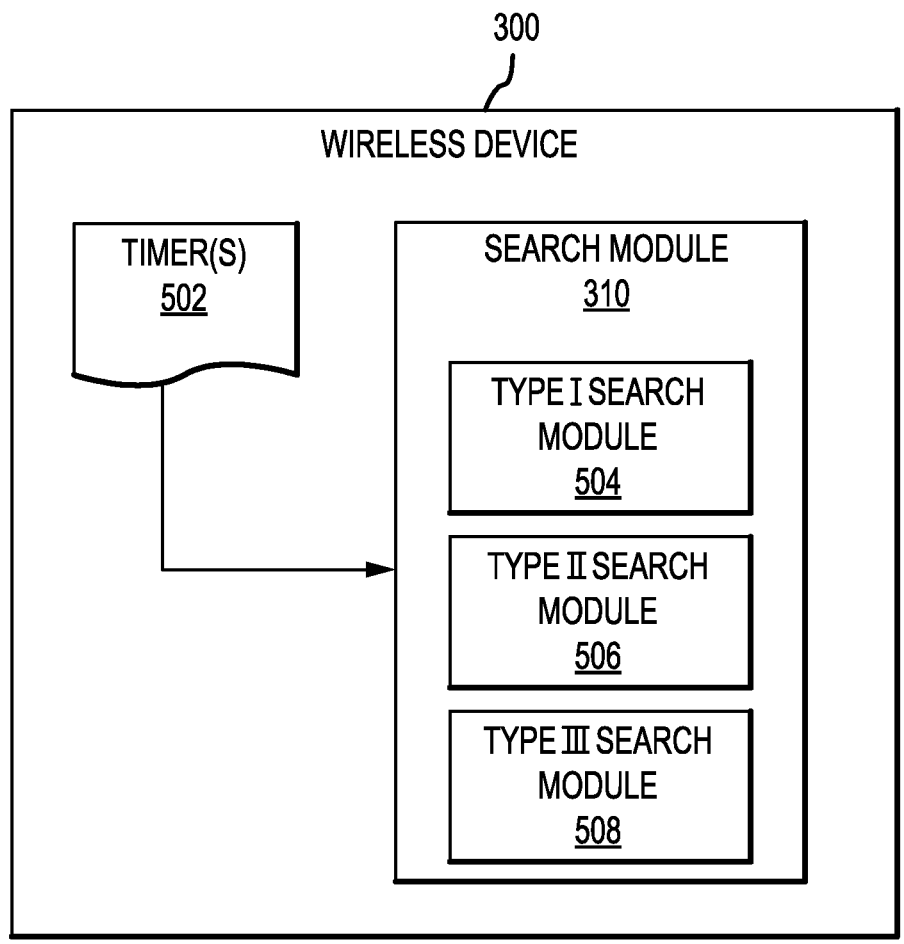
FIG. 5 illustrates a third example wireless device configured to implement a search trigger based search techniques in accordance with various aspects.

FIG. 5 illustrates a third example wireless device configured to implement a search trigger based search techniques in accordance with various aspects. The wireless device 300, illustrated in FIG. 5, may include a search module 310 that includes a Type I search module 504, a Type II search module 506, and a Type III search module 508. The wireless device 300 may also include a set of timers 502, where each search module is associated with one timer in the set of timers 502. Type I search module 504 may perform a type I search such as searching for a primary synchronization code (PSC) associated with a cell previously acquired. Type II search module 506 may implement a type II search whereby a search for a known PSC is performed. Type III search module 508 may implement a type III search for all PSCs.

Figure 6:
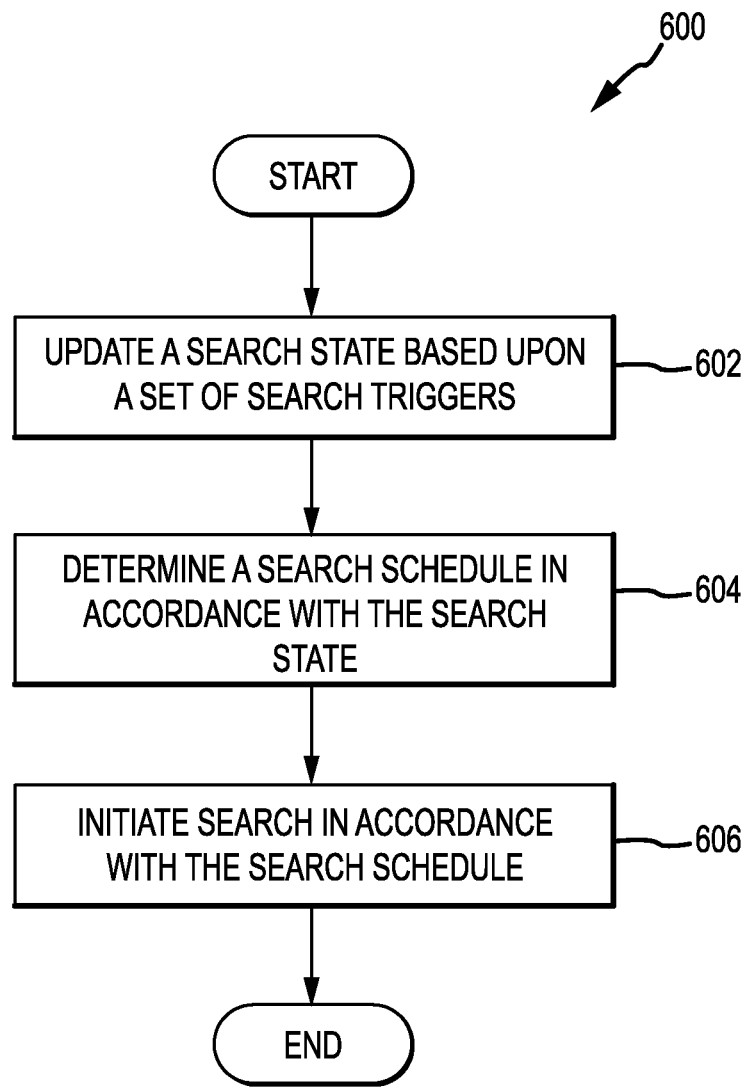
FIG. 6 illustrates a first example flow diagram for mobile search using search triggers.

FIG. 6 illustrates a first example flow diagram 600 for mobile search using search triggers. In block 602, update a search state based upon a set of search triggers. In block 604, determine a search schedule in accordance with the search state. In block 606, initiate a search in accordance with the search schedule.

Figure 7:
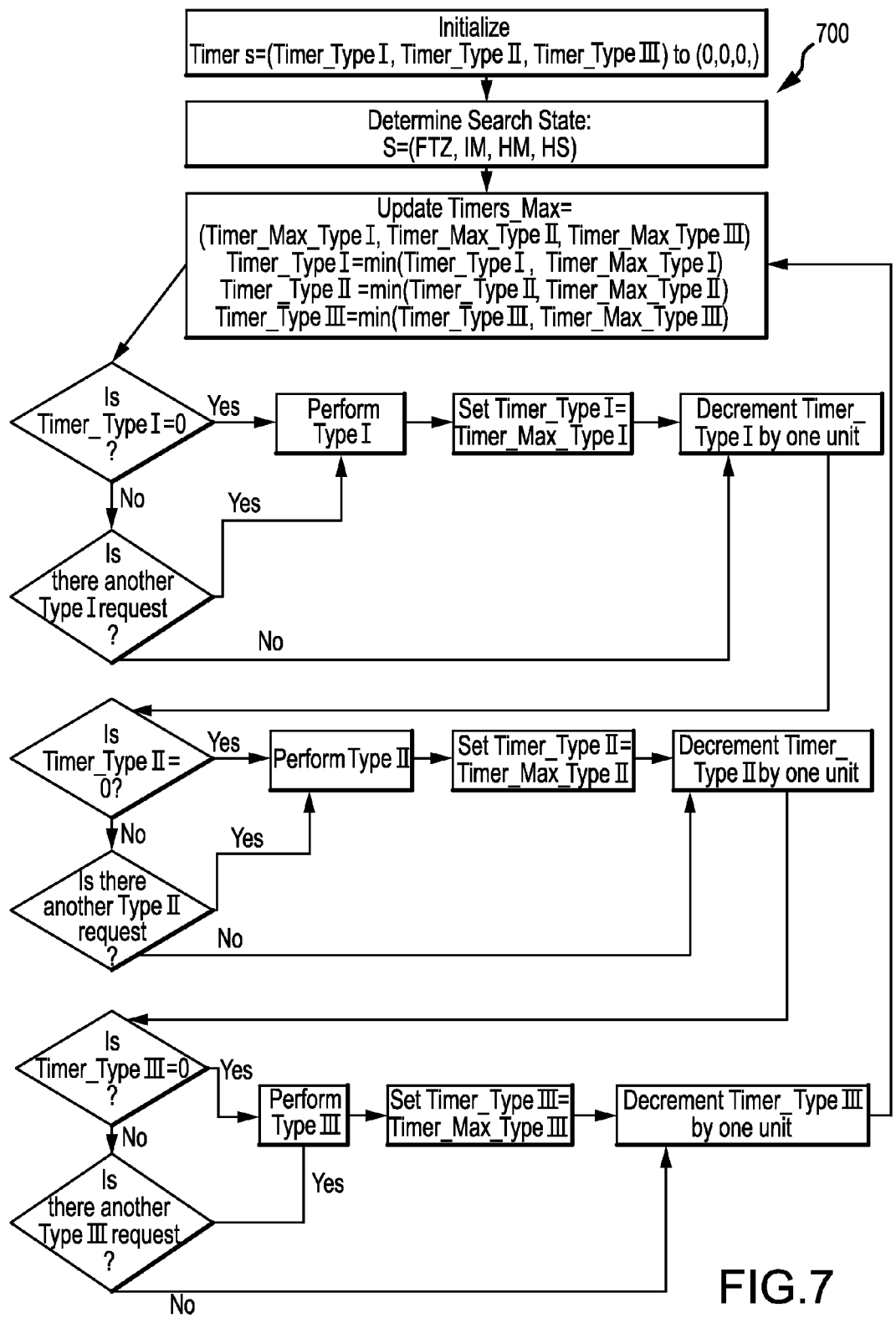
FIG. 7 illustrates an example search algorithm flow for mobile search using search triggers, wherein the search state is a quadruple of search indicators and the search schedule includes a plurality of timers.

FIG. 7 illustrates an example search algorithm flow 700 for mobile search using search triggers, wherein the search state is a quadruple of search indicators and the search schedule includes a plurality of timers.

In one aspect, the search algorithm for performing mobile search based on search triggers includes one or more of the following steps:
  decide whether to collect new input for each of search triggers at every wakeup time, based on a search state S and corresponding state determination functions $g_s(t)$,
  update the search state S using the search trigger inputs
  decide whether to perform a search for each search type, given the search state and corresponding search scheduler functions $f_s(t)$ In another aspect, a search state is a quadruple of search indicators, for example, S=(FTZ, IM, HM, HS), indicating a current UE search state. Instead of using the probability of each indicator, as a simplification use discrete values for each search indicator.
  FTZ (femto-zone) indicator may indicate whether a UE is in a femtozone or not, where FTZ may take three values {Yes, No, X}, where X means "don't know".
  IM (immobility) indicator may indicate whether a UE is immobile. A UE is considered to be immobile if its location has not changed by more than a threshold distance, such as 5 meters, for example. IM may take three values {Yes, No, X}.
  HM (high mobility) indicator may indicate whether a UE is moving at high speed, where HM may take three values {Yes, No, X}.
  HS (handset state) indicator may indicate whether a UE is in a state where a search is cheap (e.g. UE power source is a charger, a keypad is pressed, etc.). HS may take three values {Very Cheap, Cheap, Not Cheap}.

Given that each of the indicators FTZ, IM, HM, and HS can take three possible values, there are potentially $3^4=81$ possible states. However, 9 states are not possible, corresponding to IM=Yes, and HM=Yes, since a UE cannot be in an immobility state and a high mobility state simultaneously. This restriction reduces the total number of states in this example from 81 to 72.

In another example, at any given search state, a UE may use various search trigger inputs to determine whether the search state has changed. The inputs may include location information (e.g. GPS information, a fingerprint, etc.), mobility information (e.g. VCO, accelerometer, etc.), channel quality information, etc. In one aspect, the frequency of obtaining these search trigger inputs may depend on a search state and a cost associated with obtaining or updating the information. In one example, the frequency may be high or low. This feature may imply that for each state there is a frequency associated with each of the search trigger inputs which specify how often to obtain or to update the input (e.g. how often to perform a GPS scan).

In another aspect, a search scheduler may map each search state into a search frequency (i.e. how often to search) for each of the three search types (i.e., Type I, Type II, Type III). A simple scheduler with three possible search frequencies, High, Medium, and Low, is considered herein. However, it should not be construed that the example scheduler with three possible search frequencies should be exclusively used. Other schedulers with other possible search frequencies may also be within the scope and spirit of the present disclosure. For example, a search scheduler with exponential backoff may be used within the scope and spirit of the present disclosure.

Table 1, illustrated above, specifies the search frequency for each search type for all 72 possible search states. Equivalently, search frequency may be expressed by a search periodicity or a search timer. For example, a High search frequency may correspond to T=1 DRX cycle. A Medium search frequency may correspond to T=20 DRX cycles and a Low search frequency may correspond to T=100 DRX cycles.

To ensure that a search is not postponed for too long as the UE search state changes, the search scheduler may enforce a maximum periodicity for each search type, e.g., T=200 DRX cycles. For example, for every given search state, the search scheduler assigns a maximum timer value for search type. The maximum time value is the minimum of the state-dependent search periodicity and the maximum allowed time between two consecutive searches:

Timer_Max_Type I (S)=min{T_Type I (S), T_Type I_Max}

Timer_Max_Type II (S)=min{T_Type II (S), T_Type II_Max}

Timer_Max_Type III (S)=min{T_Type III (S), T_Type III_Max}.

In another aspect, the search algorithm may maintain three timers for different search types:

Timer_Type I: timer for next Type I search
Timer_Type II: timer for next Type II search
Timer_Type III: timer for next Type III search.

In one example, the timers may be updated every UE waveup time (i.e. DRX cycles). If a timer has expired for a particular search type then that search type is performed. Once a search is performed either due to timer expiration or due to a request from another entity (e.g. default idle-mode search procedure due to channel quality being below intersearch threshold), the timer is reset to Timer_Max for that particular search type (e.g. Timer_Type I=Timer_Max_Type I). The value of Timer_Max may be set by the search scheduler depending on the search state and the maximum allowed time between two consecutive searches as described above.

Figure 8:
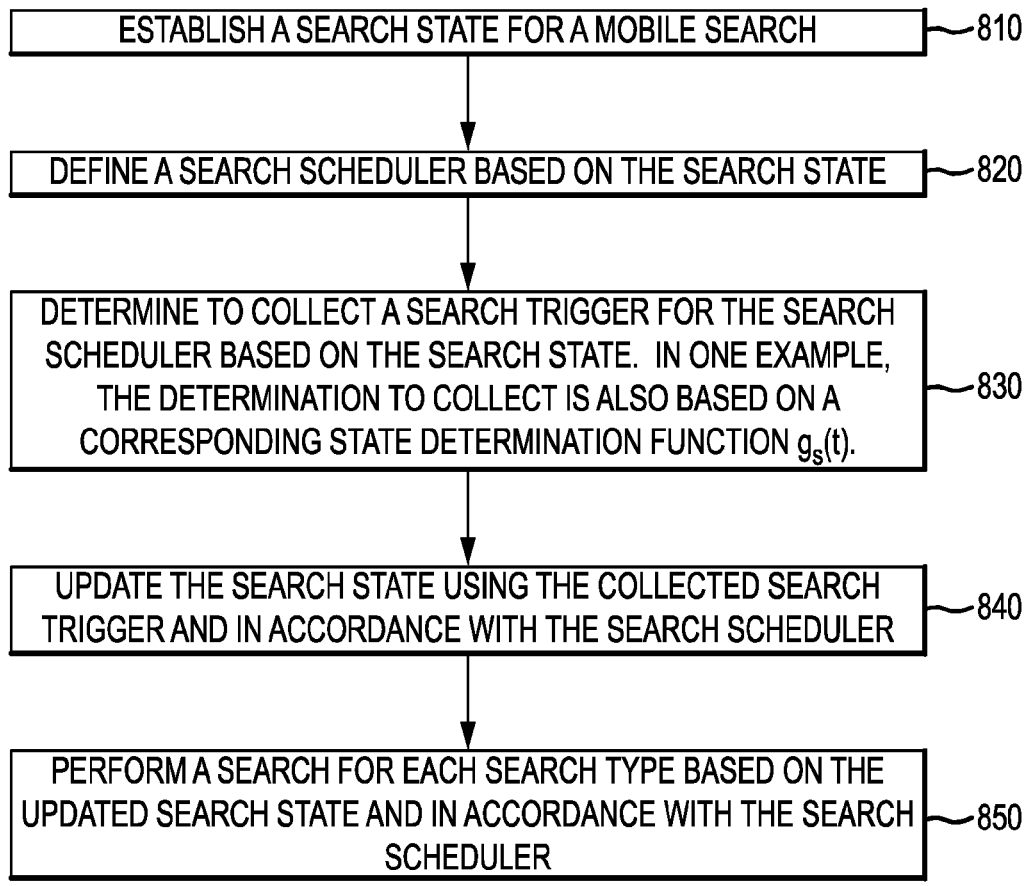
FIG. 8 illustrates a second example flow diagram for mobile search using search triggers.

FIG. 8 illustrates a second example flow diagram for mobile search using search triggers. In block 810, establish a search state S for a mobile search. In one example, a set of search states is established. In one example, each search state is an n-tuple of search indicators. For example, search indicators may be location, immobility state, high mobility state, handset state, etc. In one example, the search indicators may be represented by a value indicating the likelihood of search requirement for each indicator. In another example, the search indicators may take values from a set E which indicates the probability of a certain search indicator occurring at a given time. Alternatively, the search indicators may take values from a limited set of events, such as E={Yes, No, Uncertain}.

In block 820, define a search scheduler Ψ based on the search state S. In one example, the search scheduler Ψ is defined as a mapping of search state S into a search scheduler function $f_S(t)$. For example, the search scheduler function $f_S(t)$ may be expressed as a search frequency (e.g. how often to search) or as a function of time (e.g. an exponential backoff).

In block 830, determine to collect a search trigger for the search scheduler based on the search state. In one example, the determination to collect is also based on a corresponding state determination function $g_s(t)$. In one example, the search trigger may be based on GPS, a fingerprint, mobility information, an accelerometer input, a VCO input, a cell identifier, a channel quality metric, etc. In another example, the search determination function $g_s(t)$ is used to define a mapping from the search state S into a search trigger collection time (e.g., when to perform a GPS scan).

In block 840, update the search state S using the collected search trigger and in accordance with the search scheduler.

In block 850, perform a search for each search type based on the updated search state S and in accordance with the search scheduler. In one example, the search types may be one or more of the following: Type I search, Type II search, Type III search, etc.

Figure 9:
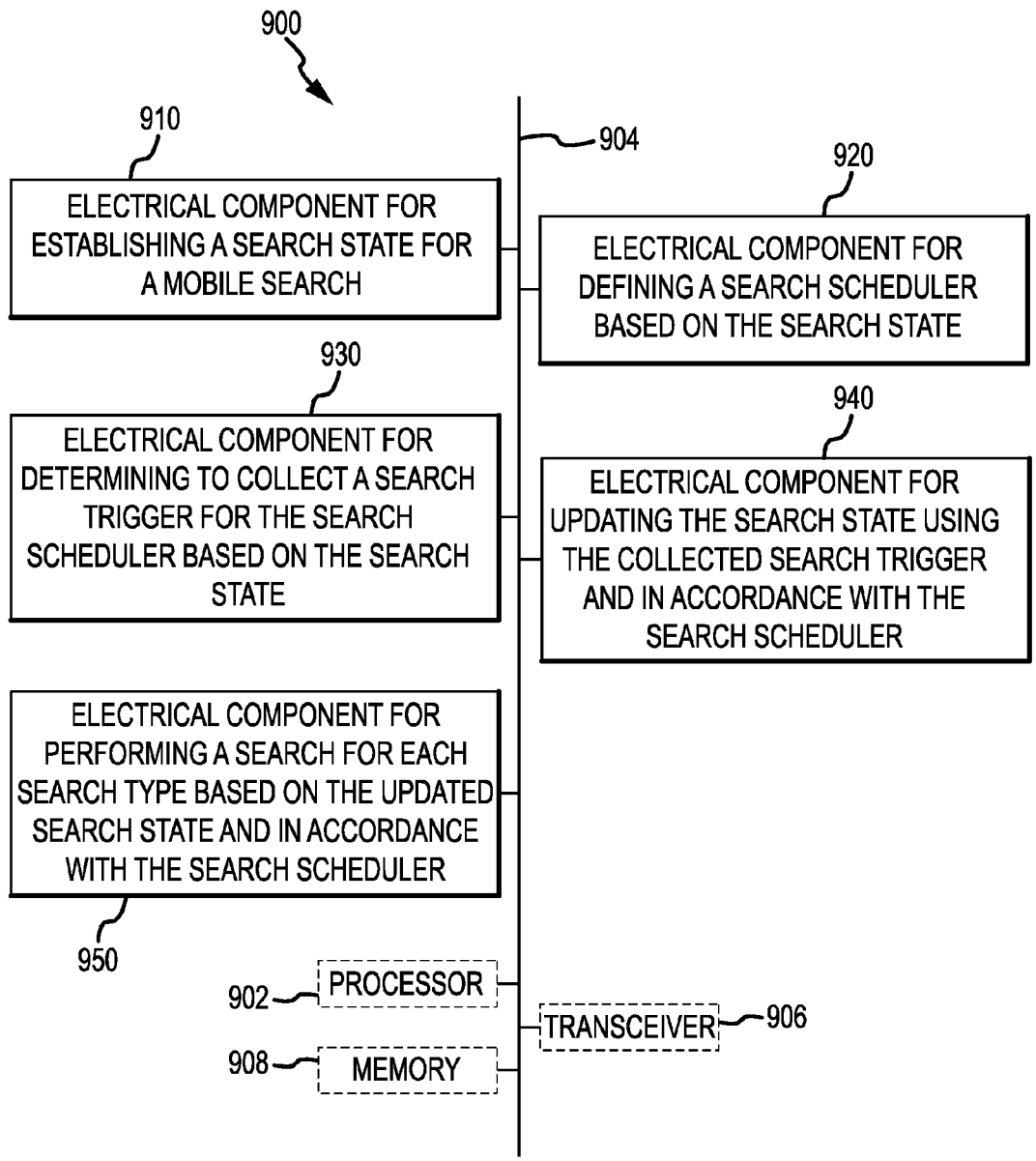
FIG. 9 illustrates an example device for mobile search using search triggers.

FIG. 9 illustrates an example device 900 for mobile search using search triggers. The device 900 may be configured as a communication device or as a processor or similar device for use within the communication device. As depicted, device 900 may include functional blocks that can represent functions implemented by a processor, software, hardware or combination thereof (e.g., firmware).

As illustrated, device 900 may include an electrical component 910 for establishing a search state S for a mobile search. The device 900 may include an electrical component 920 for defining a search scheduler Ψ based on the search state S. The device 900 may include an electrical component 930 for determining to collect a search trigger for the search scheduler based on the search state S. In one example, the determination to collect is also based on a corresponding state determination function $g_s(t)$. The device 900 may include an electrical component 940 for updating the search state S using the collected search trigger and in accordance with the search scheduler. The device 900 may include an electrical component 950 for performing a search for each search type based on the updated search state S and in accordance with the search scheduler.

Device 900 may optionally include a processor module 902 having at least one processor. In one aspect, device 900 may be configured as a communication network entity, rather than as a processor. Processor 902, in such case, may be in operative communication with electrical components 910-950 via a bus 904 or a similar communication coupling. Processor 902 may effect initiation and scheduling of the processes or functions performed by electrical components 910-950.

In related aspects, device 900 may include a transceiver module 906. A stand-alone receiver and/or stand-alone transmitter may be used in lieu of or in conjunction with transceiver module 906. In further related aspects, device 900 may optionally include a module for storing information, such as, for example, a memory module 908. The memory module 608 may include a computer readable medium and may be operatively coupled to the other components of device 900 via a bus 904 or the like. The memory module 908 may be adapted to store computer readable codes, instructions and/or data for effecting the processes and behavior of electrical components 910-950, and subcomponents thereof, or processor 902, or the methods disclosed herein. Memory module 908 may retain codes/instructions for executing functions associated with electrical components 910-950. While shown as being external to memory module 908, it is to be understood that electrical components 910-950 may exist within memory module 908.

One skilled in the art would understand that the steps disclosed in the example flow diagrams in FIGS. 6 and 8 may be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art. In one aspect, the computer-readable medium includes non-transitory computer-readable medium.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 10:
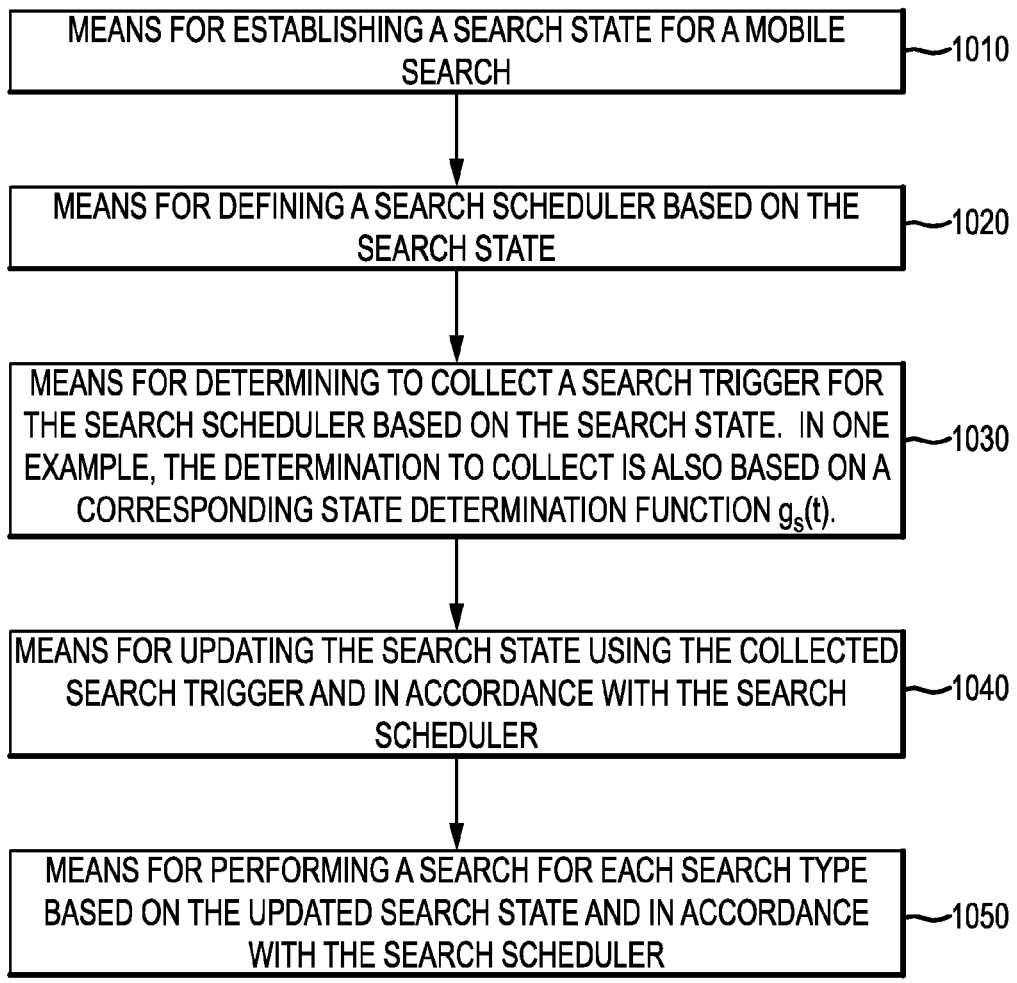
FIG. 10 illustrates an example of a device suitable for mobile search using search triggers.

FIG. 10 illustrates an example of a device 1000 suitable for mobile search using search triggers. In one aspect, the device 1000 is implemented by at least one processor comprising one or more modules configured to provide different aspects of mobile search using search triggers as described herein in blocks 1010, 1020, 1030, 1040 and 1050. For example, each module includes hardware, firmware, software, or any combination thereof. In one aspect, the device 1000 is also implemented by at least one memory in communication with the at least one processor.

Figure 11:
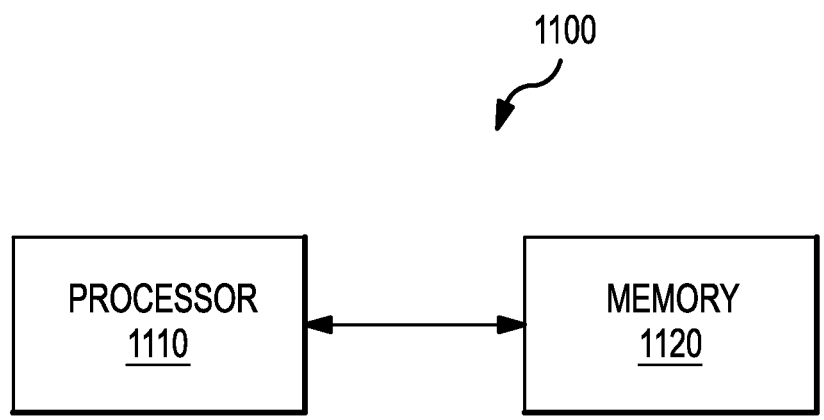
FIG. 11 illustrates an example of a device comprising a processor in communication with a memory for executing the processes for mobile search using search triggers.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 11 illustrates an example of a device 1100 comprising a processor 1110 in communication with a memory 1120 for executing the processes for mobile search using search triggers. In one example, the device 1100 is used to implement the algorithms illustrated in FIGS. 6 and 8. In one aspect, the memory 1120 is located within the processor 1110. In another aspect, the memory 1120 is external to the processor 1110. In one aspect, the processor includes circuitry for implementing or performing the various flow diagrams, logical blocks and/or modules described herein.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for a mobile device based cell search using search triggers comprising:
   establishing a search state for the mobile device to search for a new cell, wherein the search state defines how often each of a plurality of search types is performed;
   defining a search scheduler based on the search state, the search scheduler mapping the search state to a time to search for the new cell using a first search type from the plurality of search types;
   determining to collect a search trigger for the search scheduler based on the search state;
   collecting the search trigger at a time different from the time to search for the new cell using the first search type;
   updating the search state and the search scheduler using the collected search trigger when the collected search trigger indicates that the search state has changed;
   selecting a second search type from the plurality of search types for an updated time to search based on the updated search state and the updated search scheduler; and
   performing, by the mobile device, at the updated time to search, a search for the new cell based on the second search type.

2. The method of claim 1, wherein the determining to collect the search trigger is also based on a corresponding state determination function.

3. The method of claim 2, wherein the search trigger is based on one or more of the following: a Global Positioning System (GPS) information, a fingerprint, a mobility information, an accelerometer input, a VCO input, a cell identifier, a channel quality metric, a battery level of the mobile device, and a charging state of a battery of the mobile device.

4. The method of claim 2, wherein the state determination function is used to define a mapping from the search state into a search trigger collection time to determine when to collect the search trigger.

5. The method of claim 1, wherein the search state is an n-tuple of search indicators.

6. The method of claim 5, wherein the n-tuple of search indicators comprise: location, immobility state, high mobility state and handset state.

7. The method of claim 5, wherein each search indicator indicates the probability of occurrence of a set of predefined events.

8. The method of claim 1, wherein the search scheduler is defined as a mapping of the search state into a search scheduler function fS(t) expressed as a search frequency or as a function of time.

9. The method of claim 8, wherein the function of time is expressed as an exponential backoff.

10. The method of claim 1, wherein the plurality of search types comprise: Type I search, Type II search or Type III search, wherein each search type is defined as:
Type I search: searches/measures PSC whose timing is known;
Type II search: searches for a specific PSC or set of PSCs whose timing may or may not be known; and
Type III search: searches for all PSCs.

11. An apparatus comprising a processor and a memory, the memory containing program code executable by the processor for performing the following:
establishing a search state for a mobile device to search for a new cell, wherein the search state defines how often each of a plurality of search types is performed;
defining a search scheduler based on the search state, the search scheduler mapping the search state to a time to search for the new cell using a first search type from the plurality of search types;
determining to collect a search trigger for the search scheduler based on the search state;
collecting the search trigger at a time different from the time to search for the new cell using the first search type;
updating the search state and the search scheduler using the collected search trigger when the collected search trigger indicates that the search state has changed;
selecting a second search type from the plurality of search types for an updated time to search based on the updated search state and the updated search scheduler; and
performing, by the mobile device, at the updated time to search, a search for the new cell based on the second search type.

12. The apparatus of claim 11, wherein the determining to collect the search trigger is also based on a corresponding state determination function.

13. The apparatus of claim 12, wherein the search trigger is based on one or more of the following: a Global Positioning System (GPS) information, a fingerprint, a mobility information, an accelerometer input, a VCO input, a cell identifier, a channel quality metric, a battery level of the mobile device, and a charging state of a battery of the mobile device.

14. The apparatus of claim 12, wherein the state determination function is used to define a mapping from the search state into a search trigger collection time to determine when to collect the search trigger.

15. The apparatus of claim 11, wherein the search state is an n-tuple of search indicators.

16. The apparatus of claim 15, wherein the search indicators comprise: location, immobility state, high mobility state and handset state.

17. The apparatus of claim 15, wherein each search indicator indicates the probability of occurrence of a set of predefined events.

18. The apparatus of claim 11, wherein the search scheduler is defined as a mapping of the search state into a search scheduler function fS(t) expressed as a search frequency or as a function of time.

19. The apparatus of claim 18, wherein the function of time is expressed as an exponential backoff.

20. The apparatus of claim 11, wherein the plurality of search types comprise: Type I search, Type II search or Type III search, wherein each search type is defined as:
Type I search: searches/measures PSC whose timing is known;
Type II search: searches for a specific PSC or set of PSCs whose timing may or may not be known; and
Type III search: searches for all PSCs.

21. An apparatus for a mobile device based cell search using search triggers comprising:
means for establishing a search state for the mobile device to search for a new cell, wherein the search state defines how often each of a plurality of search types is performed;
means for defining a search scheduler based on the search state, the search scheduler mapping the search state to a first time to search for the new cell using a first search type from the plurality of search types;
means for determining to collect a search trigger for the search scheduler based on the search state;
means for collecting the search trigger at a time different from the time to search for the new cell using the first search type;
means for updating the search state and the search scheduler using the collected search trigger when the collected search trigger indicates that the search state has changed;
means for selecting a second search type from the plurality of search types for an updated time to search based on the updated search state and the updated search scheduler; and
means for performing, by the mobile device, at the updated time to search, a search for the new cell based on the second search type.

22. The apparatus of claim 21, wherein the determining to collect the search trigger is also based on a corresponding state determination function.

23. The apparatus of claim 22, wherein the search trigger is based on one or more of the following: a Global Positioning System (GPS) information, a fingerprint, a mobility information, an accelerometer input, a VCO input, a cell identifier, a channel quality metric, a battery level of the mobile device, and a charging state of a battery of the mobile device.

24. The apparatus of claim 22, wherein the state determination function is used to define a mapping from the search state into a search trigger collection time to determine when to collect the search trigger.

25. The apparatus of claim 21, wherein the search state is an n-tuple of search indicators.

26. The apparatus of claim 25, wherein the search indicators comprise: location, immobility state, high mobility state or handset state.

27. The apparatus of claim 25, wherein each search indicator indicates the probability of occurrence of a set of predefined events.

28. The apparatus of claim 21, wherein the search scheduler is defined as a mapping of the search state into a search scheduler function fS(t) expressed as a search frequency or as a function of time.

29. The apparatus of claim 28, wherein the function of time is expressed as an exponential backoff.

30. The apparatus of claim 21, wherein the plurality of search types comprise: Type I search, Type II search or Type III search, wherein each search type is defined as:
Type I search: searches/measures PSC whose timing is known;
Type II search: searches for a specific PSC or set of PSCs whose timing may or may not be known; and
Type III search: searches for all PSCs.

31. A non-transitory computer-readable medium storing computer-executable code wherein execution of the computer-executable code by a processor is for:
establishing a search state for a mobile device to search for a new cell, wherein the search state defines how often each of a plurality of search types is performed;
defining a search scheduler based on the search state, the search scheduler mapping the search state to a time to search for the new cell using a first search type from the plurality of search types;
determining to collect a search trigger for the search scheduler based on the search state;
collecting the search trigger at a time different from the time to search for the new cell using the first search type;
updating the search state and the search scheduler using the collected search trigger when the collected search trigger indicates that the search state has changed;
selecting a second search type from the plurality of search types for an updated time to search based on the updated search state and the updated search scheduler; and
performing, by the mobile device, at the updated time to search, a search for the new cell based on the second search type.

32. A method for a mobile device based cell search using search triggers comprising:
establishing a search state for a cell search for the mobile device to search for a new cell, wherein the search state defines, for a set of search indicators, how often each of a plurality of search types is performed;
updating the search state based on at least one of a plurality of search triggers defined by the search state, wherein the at least one search trigger indicates a change of at least one search indicator of the set of search indicators;
selecting a search type from the plurality of search types based on the updated search state; and
performing, by the mobile device, a search for the new cell based on the search type.

33. The method of claim 32, wherein the at least one of the plurality of search triggers is based on a Global Positioning System (GPS) information.

34. The method of claim 32, wherein the at least one of the plurality of search triggers is based on a fingerprint.

35. The method of claim 32, wherein the at least one of the plurality of search triggers is based on mobility information.

36. The method of claim 32, wherein the at least one of the plurality of search triggers is based on an accelerometer input.

37. The method of claim 32, wherein the at least one of the plurality of search triggers is based on a voltage controlled oscillator (VCO) input.

38. The method of claim 32, wherein the at least one of the plurality of search triggers is based on a cell identifier.

39. The method of claim 32, wherein the at least one of the plurality of search triggers is based on a channel quality metric.

40. The method of claim 32, wherein the at least one of the plurality of search triggers is based on a battery level of the mobile device.

41. The method of claim 32, wherein the at least one of the plurality of search triggers is based on a charging state of a battery of the mobile device.

* * * * *